Jan. 6, 1970 W. W. RIGROD 3,488,606
UNIDIRECTIONAL RING LASER
Filed June 18, 1965 2 Sheets-Sheet 1

INVENTOR
W. W. RIGROD
BY Wilford L. Wiener
ATTORNEY

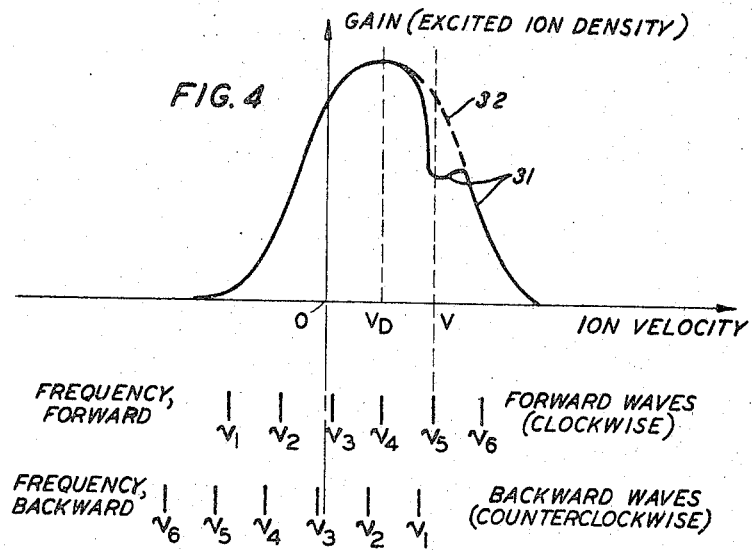
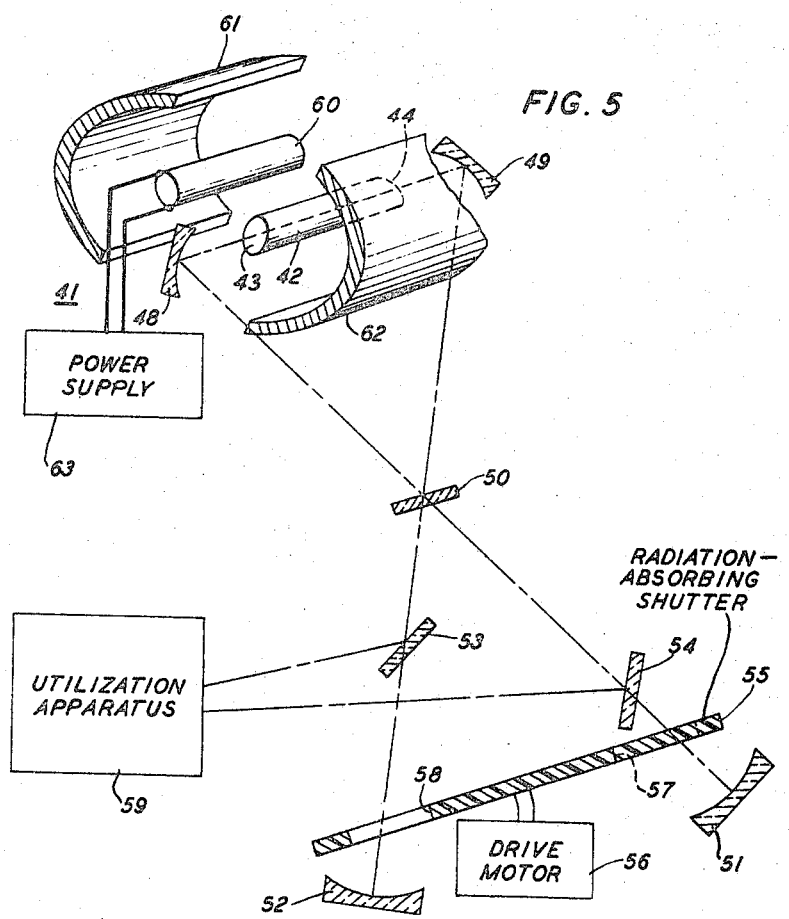

United States Patent Office 3,488,606
Patented Jan. 6, 1970

3,488,606
UNIDIRECTIONAL RING LASER
William W. Rigrod, Millington, N.J., assignor to Bell Telephone Laboratories, Incorporated, New York, N.Y., a corporation of New York
Filed June 18, 1965, Ser. No. 465,135
Int. Cl. H01s 3/05
U.S. Cl. 331—94.5
6 Claims

ABSTRACT OF THE DISCLOSURE

Ring lasers are disclosed in which unidirectional traveling wave propagation is achieved by including an active material providing substantial intermode competition and reflecting a portion of the undesired wave back upon itself to propagate around the ring resonator in the direction of the desired traveling wave. Reflection of the undesired wave is obtained by a reflector disposed outside the optical ring resonator and curved to match the reflected wave to the desired traveling wave so that the beam waists are coincident. A circular cross section of the beam is maintained by bicylindrically curved reflectors in the resonators.

---

This invention relates to apparatus for the stimulated emission of radiation, particularly the type including an optical ring resonator.

Stimulated radiation apparatus including a ring resonator is generally called a ring laser for the sake of brevity. Although most applications of ring lasers proposed hitherto involve the interaction of two oppositely directed circulatory light beams in the same ring resonator, a unidirectional traveling-wave ring laser is frequently desirable. For example, in high-power applications, the total output power should be maximized. In the bidirectional ring laser, interference between oppositely directed waves produces a moving, spatially periodic variation of field intensity that does not deplete as much of the available inverted population, i.e., does not exhaust the available power, as fully as an equivalent spectrum of unidirectional waves. Note that this power limitation in a bidirectional laser exists whether or not the two oppositely-directed beams can be fully utilized simultaneously. If only one of the two beams can be used in any event, the useful power output can be substantially more than doubled if a unidirectional traveling wave can be efficiently obtained within the ring resonator.

A second area of interest involves lasers from which the radiation must have spectral stability, i.e., stability at any single frequency in the spectrum. In ring lasers, greater stability occurs with unidirectional traveling wave oscillation than with bidirectional oscillations. For example, previous experiments with a ruby ring laser have shown that a unidirectional traveling wave is inherently more stable than one which oscillates in two directions simultaneously. These experiments utilized a Faraday rotation isolator to obtain the unidirectional traveling wave; such an arrangement is neither as efficient nor as simple as would be desirable in commercial apparatus.

A third area of interest involves gaseous ion lasers, from which it is desired to produce a relatively high power output with a high degree of spectral purity. When the laser medium has an anisotropic gain characteristic as in the ion laser, the bandwidth available for bidirectional oscillations through the active material is greater than the bandwidth for light passing through the active material in only one direction. The unidirectional traveling-wave ion ring laser can compress the available power into a smaller band, thereby increasing the ease and efficiency with which a single frequency in a single mode can be obtained from the ion laser.

A fourth area of application of a unidirectional traveling-wave ring laser involves frequency-shifting or modulating devices, such as acoustically responsive devices that are inserted within the optical ring resonator. A unidirectional traveling wave within the ring resonator will enable all the available power to be contained in a single sideband, as is desirable for most communication purposes, whereas the bidirectional ring laser wastes half the available power on the other sideband.

A fifth area of interest involves switchable lasers such as may be useful in logic operations or in digital computers generally. Switching of the direction of unidirectional traveling-wave oscillation in a ring laser is a very useful form of switching, since the oppositely-directed oscillations emerge from any corners mirror at different angles.

In addition to the Faradady rotation isolator, another technique that has been to obtain a unidirectional traveling wave in a ring laser involves the variation of the optical path length to tune both of the oppositely directed waves such that pairs of frequencies in opposite directions coincide closely with the Doppler-shifted resonances of the same velocity class of active particles, so that competition effects tend to extinguish one or the other. This method produces a unidirectional traveling wave which is neither predictable, as either direction of propagation may be initiated on a chance basis, nor as stable as would be desired in a commercial apparatus, since a chance disturbance could switch the direction of the unidirectional traveling wave.

A principal object of my invention is to provide simple and efficient means for producing a unidirectional traveling wave that is stable and predictable in directional in a ring laser.

A further object of my invention is to provide a ring laser in which the direction of unidirectional traveling wave oscillation is controllable or switchable.

Accordingly, my invention resides in the recognition that the principal object can be achieved in a ring laser by including an active material providing substantial intermode competition and then reflecting a portion of the undesired wave back upon itself to propagate around the ring resonator in the direction of the desired traveling wave. More specifically, the laser active material may be of the type, such as the rare-gas ion lasers for which stimulated radiation "burns a hole" in the gain characteristic substantially wider than the mode spacing; and an external reflecting element of the optical ring resonator is disposed beyond a partially transmissive reflecting element of the optical ring resonator to intercept the undesired wave and is oriented to reflect that wave back in the optical ring resonator to propagate therearound in reversed direction. The desired wave is thereby reinforced and is enabled stably to quench the undesired wave through intermode competition. The reversed wave is preferably substantially matched to the desired wave in the resonator by techniques more fully described hereinafter.

Generally, substantial competition between oppositely directed waves is provided also in materials, such as ruby, in which "hole burning" does not occur. The invention is applicable also to such homogeneously broadened materials.

A more complete understanding of the invention may be obtained from the following detailed description in conjunction with the drawing, in which:

FIG. 4 shows curves that are helpful in understanding the theory and operation of the invention; and FIG. 5 is a partially pictorial and partially schematic showing of an embodiment of the invention providing the ability to switch the direction of traveling wave oscillation.

Figure 1:
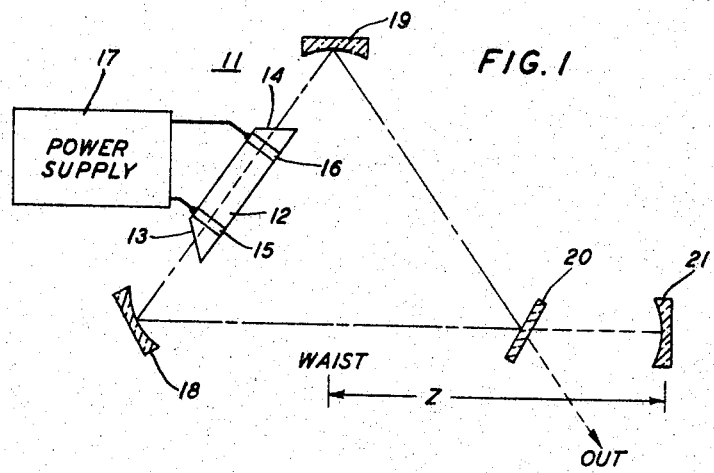
FIG. 1 is a partially pictorial and partially schematic showing of a preferred embodiment of the invention.

In the preferred embodiment of FIG. 1, the active element 11 of the laser comprises an active material, its containing and exciting apparatus and an optical ring resonator including the reflecting elements 18, 19 and 20. For example, the active material may be argon gas contained within a tube 12 having Brewster-angle end windows 13 and 14. The excitation means illustratively comprises electrodes 15 and 16 attached to tube 12 and a radio-frequency power source 17. The power source 17 is connected to the electrodes 15 and 16 to supply sufficient power through a discharge in the active medium to populate the upper one of an optically connected pair of levels in the active medium while maintaining the argon gas substantially ionized. The reflecting elements 18 and 19 are disposed along the axis of tube 12 at angles appropriate for forming a closed optical path with the third reflecting element 20, which is laterally displaced from the axis of the tube 12 and likewise appropriately oriented. The reflecting element 20 is made partially transmissive.

In the preferred embodiment of the invention, as illustrated in FIG. 1, an external reflector 21 is disposed beyond partially transmissive reflecting element 20 in line with the light propagation path between elements 18 and 20 and oriented to intercept radiation leaving the resonator along this path and to reflect it backwards along this path.

The reflecting elements 18 and 19 are preferably opaque to be highly reflective and are curved to focus light beams propagating in either direction for most effective utilization of the active material within tube 12. Generally, the beam is desirably circular in cross-section; and the focusing reflectors 18 and 19 are bicylindrically curved as described hereinafter. While a circular beam can also be obtained with planar reflectors, such reflectors permit a substantial light loss through spreading of the beam periodically.

The partially transmissive reflecting element 20 is illustratively shown as planar, although it also could be a focusing element. In general, the desirable focusing action can be concentrated in one or two of the reflecting elements; or it can be accomplished by all of them.

The external reflecting element 21 is preferably opaque to the highly reflective and curved to focus the return beam to match the traveling-wave beam propagating within the resonator in the clockwise direction, i.e., in the direction from reflector 20 to reflector 18. The curvature of reflector 21 employed for the matching condition is related to the focusing action, or lack of it, in the optical resonator and will be more fully described hereinafter.

Figure 3:
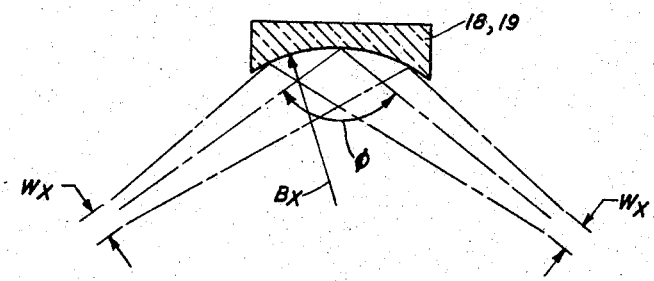
FIG. 3 is an explanatory diagram relating to the focusing reflectors of the ring resonator of the embodiment of FIG. 1.

More particularly, reference is made to FIG. 3, in which the curvature of reflecting element 18 or reflecting element 19 is shown in the cross-section plane illustrated in FIG. 1. Assume, for purposes of illustration, that the light is approaching the reflecting element from the left below. The reflection can be seen to occur at oblique incidence. The effective focal length of the reflecting element in the plane of the ring with a radius of curvature $B_x$ in that plane is:

$$f_x = \tfrac{1}{2} B_x \cos(\Phi/2) \quad (1)$$

where $\Phi$ is the angle through which the light beam is reflected. In contrast, in the plane orthogonal to that of the ring, the effect of the oblique incidence is somewhat different. The effective focal length in that plane obeys a relationship, as follows:

$$f_y = \tfrac{1}{2} B_y \cdot \frac{1}{\cos(\phi/2)} \quad (2)$$

where $B_y$ is the radius of curvature in that plane.

To maintain a circular cross section of the beam while focusing it, the effective focal lengths in the plane of the ring and the plane orthogonal thereto should be equal, i.e.:

$$f_x = f_y \quad (3)$$

or $$B_y = B_x \cos^2(\Phi/2) \quad (4)$$

Such a reflecting element is called astigmatic and can be formed by suitable polishing techniques, as disclosed by W. L. Bond in Applied Optics, vol. 2, p. 761 (July 1963), or by bending thin spherical mirrors, for example by mounting them in a jig with different flexing forces applied in the orthogonal planes of interest. Alternatively, unflexed spherical mirrors can be used if preceded by suitable astigmatic lenses that are coated for low reflection losses.

Figure 2:
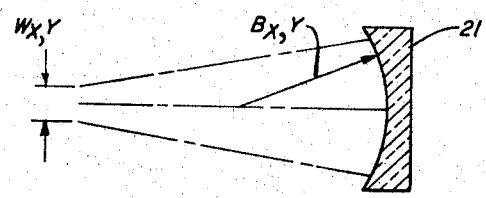
FIG. 2 is an explanatory diagram relating to the external reflecting element of the embodiment of FIG. 1.

Reference is now made to FIG. 2, in which the curvature of the external reflecting element 21 in the cross-section plane of the ring is illustrated. If a circular cross section of the beam within the optical resonator is maintained, the external reflecting element 21 will have the same curvature in the plane of the ring as in the plane orthogonal thereto, since it is oriented for reflection at normal incidence.

As shown by H. Kogelnik in the article, "Imaging of Optical Modes—Resonators with Internal Lenses," Bell System Technical Journal, vol. 44, p. 455 (March 1965), a waist of radius $w_1$ at a distance $d_1$ from a lens of focal length $f$ is imaged at a distance $d_2$ to a waist of radius $w_2$, given by $$\left(\frac{\pi w_1 w_2}{\lambda}\right)^2 = (d_1 + d_2)f - d_1 d_2 \quad (5)$$

where $\lambda$ is the light wavelength.

In the case of reflector 21, it is desired for matching that the waists coincide somewhere between reflectors 18 and 20. Thus, in the plane of the ring $w_1 = w_2 = w_x$ and $d_1 = d_2 = Z$, and by appropriate manipulation:

$$B_x = 2f_x = Z + \frac{1}{Z}\left(\frac{\pi w_x^2}{\lambda}\right) \quad (6)$$

Similarly, in the plane perpendicular to the plane of the ring:

$$B_y = Z + \frac{1}{Z}\left(\frac{\pi w_y^2}{\lambda}\right) \quad (7)$$

where $w_x = w_y$ and $B_x = B_y$ for the specific arrangement described hereinbefore.

The operation of the invention may be more particularly explained by reference to FIG. 4, in which curve 32, shown dotted in part, represents the Doppler-broadened transition line of the active material in the absence of an optical resonator and curve 31 represents the transition line of the laser as modified by the optical resonator including reflecting elements 18, 19 and 20 when the set of waves in the forward direction and the set of waves in the backward direction have frequencies and mode spacings as indicated below curves 31 and 32. Curves 31 and 32 are plots of gain or excited ion density versus ion velocity within the active medium.

Assume for purposes of illustration that the length of the optical path and other conditions provided by the resonator are particularly favorable to the propagation of oppositely-directed traveling wave radiations therein, at frequencies $\nu_1$ and $\nu_5$, where $$\nu_5 = \nu_0(1 + V/c); \quad \nu_1 = \nu_0(1 - V/c) \quad (8)$$

$\nu_0$ is the frequency corresponding to zero ion drift velocity, and V is the ion velocity at which the hole is burned, as depicted by curve 31. Curve 31 illustrates the fact that these oppositely-directed radiations derive most of their power from the same velocity class of atoms, centered about the velocity V, because of the above relationships that derive from the Doppler effect. Their mode spacing as shown in FIG. 4, is less than the hole width.

In other words, frequencies $\nu_1$ and $\nu_5$ are competing. When the two competing radiation fields are ever so slightly unequal in intensity, the stronger of the two fields will dominate and cause the extinction of the weaker field, assuming that the weaker field has no other sources of amplification but the group of atoms shared with the stronger field. It is noted, in this connection, that the probability of stimulated emission is proportional to the radiation intensity; and, by drawing power from the population inversion in the same velocity class of excited ions, the stronger wave acquire added strength at the expense of the weaker one. As a result of the gain competition between the oppositely directed radiations, there can result a fluctuating division of power or a complete quenching of one wave by the other. In general the direction of traveling wave oscillation is neither predictable nor stable and may switch randomly.

Curve 31 shows how the gain curve is depressed in the presence of forward-wave oscillations at frequency $\nu_5$, over a range of ion velocities centered about V. In terms more familiar in the art, the radiation $\nu_5$ "burns a hole" in the gain curve. When the width of this hole is substantially broader than the corresponding frequency separation between adjacent modes, gain competition between forward frequency $\nu_5$ and backward frequency $\nu_1$, exists even when they do not correspond to precisely the same velocity class V. When this condition obtains, the procedure illustrated in FIG. 1 wil cause the clockwise oscillations at all frequencies in the gain spectrum to dominate over all counter-clockwise oscillations.

In order to obtain a unidirectional traveling wave in the active element 11, the external reflector 21 strengthens the wave in the preferred (i.e., forward) direction, which is clockwise in this case, thereby ensuring stable oscillations in that direction. The portion of the light formerly propagating in the counter-clockwise direction that is now caused to propagate in the clockwise direction further depletes the available gain of the atoms with velocities in the region of overlap. As the strengthened clockwise wave grows, the depletion process extends further to neighboring velocity classes. The imbalance increases, and the counter-clockwise wave, i.e., the wave that can be intercepted by reflector 21, is extinguished. A portion of the wave propagating in the clockwise direction can be extracted, as indicated by way of partially transmissive element 20 for utilizations; and the stability of the unidirectional traveling wave will not be disturbed. In fact, it is desirable that the transmittance of the element 20 be optimized to obtain the maximum possible output power from the preferred traveling wave in the resonator. This relationship is, nevertheless, not required for a stable unidirectional traveling wave in the active element 11.

It should also be understood that perfect matching of the reflected wave to that in the resonator is desirable but not essential, as only a small amount of reflected energy is usually sufficient for a stable unidirectional traveling wave in the chosen direction.

From the foregoing description of the "hole width" as being substantially wider than the mode spacing, it can be appreciated that some active materials are more suitable for a unidirectional traveling wave ring laser according to the invention than are others. Preferred materials are either those such as ruby crystals, that are "homogeneously broadened," or those such as the raregas ion laser specified above, that have hole widths which are wider than the mode spacing. It is characteristic of both types that they provide a substantial degree of competition between waves in opposite directions. On the other hand, when active materials that have fairly small hole widths, such as the well-known helium-neon gas mixture, are employed, the action of reflector 21 can be made effective by tuning the resonator finely to cause the resonances of oppositely directed oscillations to coincide rather closely.

A subsidiary object of the invention, mentioned above, is to switch the direction of traveling wave oscillations in a manner suitable for logic operations. An appropriate embodiment of this form of the invention is shown in FIG. 5. Active element 41 comprises a crystalline ruby rod shaped in any of the known manners and provided with the polished Brewster-angle end surfaces 43 and 44, pumping or excitation means including mercury lamp 60 and its power source 63, and the ellipsoidal reflectors 61 and 62 having foci at lamp 60 and ruby rod 42 to concentrate the pumping light upon the ruby rod 42. The optical ring resonator includes reflecting elements 48, 49 and 50, which are adapted and oriented in substantially the same way as the corresponding components in the embodiment of FIG. 1.

External to the resonator, beyond the partially transmissive reflecting element 50 lie the partially transmissive beam-splitting reflectors 53 and 54 for the clockwise and counterclockwise traveling waves, respectively. Beyond reflectors 53 and 54 lies a radiation absorbing shutter 55, which nevertheless has apertures 57 and 58 staggered so that for any given rotational position of the shutter no more than one of the traveling waves can pass. The shutter 55 is driven by a drive motor 56 in accordance with the desired control function.

Beyond the shutter 55 in line with reflecting elements 48, 50 and 54 is disposed a reflecting element 51 that is substantially like reflecting element 21 in the embodiment of FIG. 1. Beyond the shutter 55 in line with reflecting elements 49, 50 and 53 is disposed a reflecting element 52 that is also substantially like reflecting element 21 in the embodiment of FIG. 1. In the position of shutter 55 illustrated, aperture 58 is aligned with reflecting elements 49, 50, 53 and 52; while an opaque portion of shutter 55 is aligned with reflecting elements 48, 50, 54 and 51. In this set of conditions, the counterclockwise direction in the optical ring resonator is the preferred direction, since the clockwise traveling wave is reflected back upon itself by reflecting element 52.

By an appropriate rotation of shutter 55 to align an aperture with mirror 51, the preferred direction can be reversed. The output beam in the preferred direction is abstracted by either reflecting element 53 or reflecting element 54 and directed to a utilization apparatus 59, which is illustratively a photosensitive switching apparatus or digital computer apparatus that responds differently to the alternative output beams.

It will be noted that the radiation loss inherent in the use of a shutter is not critical in such a system. In systems needing greater efficiency and total power output, a reflective optical shutter system may be employed in order to recollect all components of the traveling wave in the preferred direction. In either case, a bistable ring laser is provided.

When the active medium is characterized by gain anisotropy, as in the argon ion laser of FIG. 1, or exhibits a frequency shift dependent upon the direction of radiation, other means can be employed for switching the direction of unidirectional traveling waves in a ring laser, as disclosed in my concurrently filed application with T. J. Bridges, which is now U.S. Patent No. 3,414,839.

In all cases, the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. Apparatus adapted for the stimulated emission of radiation, comprising an optical ring resonator including at least one focusing reflecting element and one partially transmissive reflecting element defining a closed path in said ring resonator, an active material forming a part of said closed path and having a pair of energy levels between which a population inversion can be established, means for exciting said material to populate the higher one of said pair of energy levels, the resonator tuning and said material providing substantial competition between radiations propagating in opposite directions in said ring resonator, and means for reversing the direction of a portion of a nonpreferred radiation to propagate within said resonator in the direction of the preferred radiation, comprising a reflecting element disposed outside the resonator to intercept the nonpreferred radiation and oriented to reflect said portion of said nonpreferred radiation back into said resonator, said outside reflecting element being curved to match said portion of said nonpreferred radiation to said preferred radiation by directing said nonpreferred radiation to a beam waist substantially coincident with the beam waist of the preferred radiation, said reversing means strengthening said preferred radiation at the expense of the nonpreferred radiation.

2. Apparatus according to claim 1 in which the focusing reflecting element is bicylindrically curved to maintain a circular cross section of the beam.

3. A laser comprising an optical ring resonator including a plurality of reflecting elements, one of which is partially transmissive and another of which is bicylindrically curved to focus the beam to a circular cross section, an active medium disposed along the optical path of the ring resonator and having a gain hole width substantially greater than the mode spacing provided by the resonator, means for exciting the active medium, and a reflecting element disposed external to the ring resonator in optical alignment with the partially transmissive element and another of the reflecting elements to return a portion of the energy transmitted through the partially transmissive element back into the ring resonator for propagation therearound in reversed direction, the external reflecting element being curved to direct the returned radiation to a beam waist substantially coincident with the beam waist of radiation already propagating in said direction.

4. A laser according to claim 3 in which all of the reflectnig elements of the resonator except the partially transmissive element are substantially opaque and are bicylindrically curved to focus the beam to a circular cross section, said partially transmissive reflecting element is planar, and the external reflecting element is substantially opaque and spherically curved to direct the returned radiation to a beam waist substantially coincident with the beam waist of the other radiation.

5. A laser according to claim 4 in which the active medium is a rare-gas, and said exciting means subjects said gas to a discharge suitable for maintaining a sufficiency of excited ions to provide an inverted population therein.

6. A laser according to claim 4 in which the active medium is a crystalline material providing a homogeneously broadened gain characteristic and the exciting means is a source of suitable pumping radiation.

References Cited

UNITED STATES PATENTS 3,323,411　6/1967　Killpatrick _____ 331—94.5

OTHER REFERENCES

Moss et al.: "Unidirectional Oscillation in Trav. Wave Ring Laser," Infrared Physics, vol. 4 (1964), pp. 209–211.

Bagaev et al.: "Spectral Characteristics of a Gas Laser With a Traveling Wave," JETP Letters, vol. 1, No. 4, May 15, 1965, pp. 114–116.

RONALD L. WIBERT, Primary Examiner

E. BAUER, Assistant Examiner

U.S. Cl. X.R.

356—106